A. J. SMITH.
ANIMAL TRAP.
APPLICATION FILED AUG. 1, 1912.

1,147,822.

Patented July 27, 1915.

WITNESSES
S. G. Thurni
Katherine Holt

INVENTOR.
August J. Smith,
By Morsell & Caldwell
ATTORNEYS

UNITED STATES PATENT OFFICE.

AUGUST J. SMITH, OF MILWAUKEE, WISCONSIN.

ANIMAL-TRAP.

1,147,822.        Specification of Letters Patent.        Patented July 27, 1915.

Application filed August 1, 1912. Serial No. 712,632.

*To all whom it may concern:*

Be it known that I, AUGUST J. SMITH, a citizen of the United States, and resident of Milwaukee, in the county of Milwaukee and State of Wisconsin, have invented new and useful Improvements in Animal-Traps, of which the following is a description, reference being had to the accompanying drawings, which are a part of this specification.

This invention relates to improvements in animal traps and more particularly to traps for exterminating rats, mice and other like rodents.

It is one of the objects of this invention to provide an animal trap which is of simple construction, contains the minimum number of parts and which is of a form to negative the idea of an inclosure in order to easily lure the animal within the operating parts of the trap.

A further object of the invention is to provide an animal trap which is adapted to kill the animals caught and which will catch a number of animals at the same time.

A further object of the invention is to provide an animal trap which may be entered from all sides of the trap.

With the above, and other objects in view, the invention consists of the improved animal trap and its parts and combinations as set forth in the claim, and all equivalents thereof.

Figure 1:
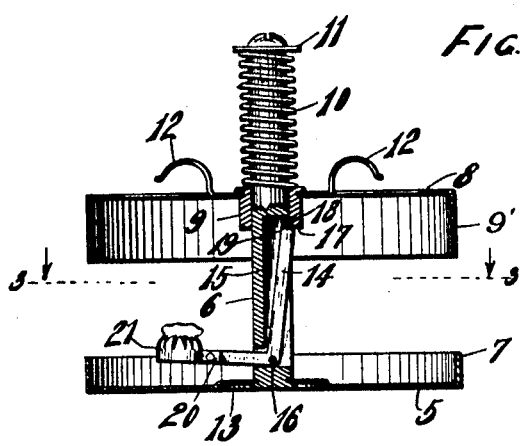
Figure 2:
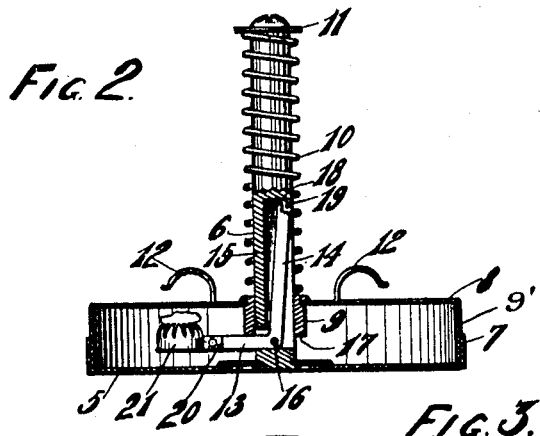
Figure 3:
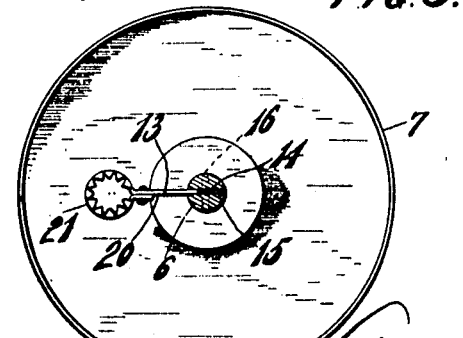

In the accompanying drawing in which the same reference characters indicate the same parts in all of the views: Figure 1 is a vertical central sectional view of the improved animal trap with the parts in open or set position; Fig. 2 is a similar view thereof with the parts in closed position; and, Fig. 3 is a transverse sectional view of the trap taken on line 3—3 of Fig. 1.

Referring to the drawing the numeral 5 indicates the base portion of the trap and 6 the standard or stem thereof. The base is preferably of annular form and is provided with an upstanding peripheral flange 7 which forms the lower animal engaging portion of the trap. A slidable member 8 mounted on the stem 6 is also of annular form and is provided with a depending peripheral flange 9' of a diameter to closely fit within the flange 7 of the base or lower member 5 of the trap. This slidable member forms the upper animal engaging member of the trap. The slidable member of the trap is formed with a depending sleeve 9 which loosely surrounds the stem 6, and a coiled spring 10 surrounding the stem and interposed between the sleeve and the washer or enlargement 11 of the upper end of the stem serves to force the slidable member to its lowermost position. Portions cut out from the upper part of the slidable member are bent upwardly in a curve to form finger hooks 12 for convenience in opening or moving the slidable member to its upper or open position.

In order to releasably hold the slidable member in its upper position a bell crank lever latch 13 is provided and the vertical arm 14 of this lever is positioned within the elongated slot 15 of the stem and a pin 16 passing transversely through the stem and the lower part of the arm pivotally connects the lever to the stem.

The upper end of the arm 14 is adapted to be swung outwardly to a position to engage the lower edge 17 of the sleeve 9 when the slidable member is in its upper position and hold said member in this position against the tension of the spring. The upper end of the said arm is provided with a tongue 18 which engages the shoulder 19 of the stem to prevent the upper end of the arm from swinging outwardly beyond its sleeve engaging position. The horizontal arm 20 of the bell crank lever extends outwardly from the stem and is provided with a pronged bait holding receptacle 21 on its outer end.

In use the trap is baited and is set or opened by holding the stem horizontally with the vertical arm of the bell crank lever extending downwardly. The slidable member is now pulled outwardly by the finger hooks until the lever arm drops downwardly and engages the sleeve of the slidable member. The trap is now set and if the horizontal arm of the lever is pressed downwardly a slight distance by an animal the slidable member will be released and the animal will be caught between the flanges of the base and slidable members and killed by the force of the blow or strangled by the constant pressure of the members. It is obvious that more than one animal may be within the trap when released and that they will also be caught and killed at the same time.

From the foregoing description it will be seen that the improved animal trap is of very simple construction and is well adapted for the purpose desired.

What I claim as my invention is:

An animal trap, comprising a base member provided with an upstanding flange and with a standard having an elongated recess formed therein, a slidable member mounted on the standard and provided with a depending flange which engages the base flange when in closed position, a coiled spring surrounding the standard and interposed between the slidable member and the upper end of the standard, and a bell crank lever pivoted to the standard and having its vertically extending arm within the elongated recess and its upper end positioned to releasably engage a portion of the slidable member to releasably hold said slidable member in open position, the upper end of the bell-crank lever having a tongue for limiting its outward movement, the horizontal arm of said bell crank lever extending outwardly from the standard and provided with a bait holding means and adapted to be moved downwardly to trip the upper member.

In testimony whereof, I affix my signature, in presence of two witnesses.

AUGUST J. SMITH.

Witnesses:
C. H. KEENEY,
L. G. THEURER.

Copies of this patent may be obtained for five cents each, by addressing the "Commissioner of Patents. Washington, D. C."